United States Patent
Fang

(10) Patent No.: US 9,454,688 B1
(45) Date of Patent: Sep. 27, 2016

(54) HIGH CAPACITY 2D COLOR BARCODE DESIGN AND DECODING METHOD

(71) Applicant: KONICA MINOLTA LABORATORY U.S.A., INC., San Mateo, CA (US)

(72) Inventor: Gang Fang, San Bruno, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 14/803,349

(22) Filed: Jul. 20, 2015

(51) Int. Cl.
*G06K 7/10* (2006.01)
*G06K 7/14* (2006.01)
*G06K 19/06* (2006.01)

(52) U.S. Cl.
CPC ......... *G06K 7/1417* (2013.01); *G06K 7/10722* (2013.01); *G06K 19/0614* (2013.01)

(58) Field of Classification Search
CPC . G06K 7/12; G06K 7/1417; G06K 19/06037
USPC .......... 235/462.04, 462.07, 462.25
See application file for complete search history.

(56) References Cited

U.S. PATENT DOCUMENTS

| | | | |
|---|---|---|---|
| 5,714,745 A * | 2/1998 | Ju | G01J 3/51 235/462.04 |
| 5,818,032 A | 10/1998 | Sun et al. | |
| 7,751,585 B2 | 7/2010 | Jancke | |
| 7,913,922 B1 | 3/2011 | Roth | |
| 8,534,560 B2 | 9/2013 | Endo et al. | |
| 2005/0023354 A1 | 2/2005 | Sali et al. | |
| 2006/0283952 A1* | 12/2006 | Wang | G06K 7/10722 235/462.01 |
| 2007/0091322 A1* | 4/2007 | Tano | G06K 7/14 356/610 |
| 2007/0152060 A1* | 7/2007 | Kiliccote | G06K 7/1443 235/462.09 |
| 2007/0278303 A1 | 12/2007 | Cattrone | |
| 2009/0242649 A1 | 10/2009 | Mizukoshi et al. | |
| 2011/0110586 A1 | 5/2011 | Takura et al. | |
| 2011/0186632 A1 | 8/2011 | Yi et al. | |
| 2014/0144991 A1 | 5/2014 | Tian et al. | |
| 2014/0191036 A1* | 7/2014 | Manion | G06K 19/0614 235/454 |

OTHER PUBLICATIONS

Parikh et al., "Localization and Segmentation of A 2D High Capacity Color Barcode", IEEE Workshop on Applications of Computer Vision, WACV 2008. pp. 1-7.
Hao et al., "COBRA: Color Barcode Streaming for Smartphone Systems", Proceedings of the 10th international conference on Mobile systems, applications and services, 2012, pp. 85-98.
Mayer et al., "Design of High Capacity 3D Print Codes Aiming for Robustness to the PS Channel and External Distortions", IEEE, 2009, pp. 105-108.
Querini et al., "Color Classifiers for 2D Color Barcode", Proceedings of the 2013 Federated Conference on Computer Science and Information Systems, 2013, pp. 611-618.

* cited by examiner

*Primary Examiner* — Daniel St Cyr
(74) *Attorney, Agent, or Firm* — Chen Yoshimura LLP

(57) ABSTRACT

A 2D color barcode decoding method is disclosed. The barcode includes a 2D array of data cells, corner locators, and border reference cells. Each data cell and reference cell has one of four primary colors (e.g. CMYK or CMWK). The reference cells, which have known colors, are used to calculate the channel offset (a spatial offset) of each primary color and the reference color values of each primary color. The reference cells are also used to calculate a color conversion matrix between color intensity (RGB) values and the primary color. Pixel-color probabilities are calculated from the pixel color intensity values using the color conversion matrix. The color of each data cell is determined using the pixel-color probabilities, the pixel color intensity values, the reference color intensity values, and the channel offset.

16 Claims, 3 Drawing Sheets

HIGH CAPACITY 2D COLOR BARCODE DESIGN AND DECODING METHOD

BACKGROUND OF THE INVENTION

1. Field of the Invention

This invention relates to two-dimensional (2D) color barcode, and in particular, it relates to the design and decoding of high capacity 2D color barcode.

2. Description of Related Art

Barcode is an optical machine-readable representation of data. A 2D color barcode is formed of small square or rectangular cells arranged in a two-dimensional manner, e.g., in both horizontal and vertical directions, and one color is used for each cell. Different colors represent different data values. The relation between the data capacity of the barcode and the cell number and the number of colors can be expressed as Data capacity=(Cell Number)×$\log_2$(Num of color representations)

A barcode design that uses small cell sizes and more color representations can achieve a relatively high data capacity in a given area. However, various factors limit how small cells can be.

Channel offset of digital printers is an inevitable effect caused by hardware imperfections. Channel refers to the different primary colors used by the printer (e.g. cyan, magenta, yellow, and black or CMYK); channel offset refers to the fact that when pixels having the same position values are printed using different primary colors, the actual position of the printed pixels may not be exactly the same. The offset amount may be global (i.e. the same offset across the entire page) and/or local (i.e. they may be different in different areas of a page). When barcode cells are small, the channel offset effect may affect the result noticeably, causing the cell locations to shift and the space between neighboring cells to vary.

Also, the color density of a cell depends on the size of the cell area. The color density of a small area is relatively low when compared with that of a large area, which may cause difficulty in color determination for barcode with small cells.

Furthermore, the working conditions of different printers and scanners are variable. Different printers will have different output, so will different scanners. The working conditions may also vary with time, so that the output from one printer or one scanner at different times may also vary. For example, when a 2D color barcode is printed on paper or displayed on a display screen such as the screen of a mobile device, and read by a camera or camera-based barcode reader (as opposed to a flat-bed type scanner), perspective projection and non-uniform illumination may present a challenge for decoding the barcode.

SUMMARY

Embodiments of the present invention provide a design of 2D color barcode layout and a algorithm which can decode the barcode to reduce the impact of the various factors discussed above.

An object of the present invention is to provide a high capacity 2D color barcode design and a method for decoding the barcode that works well under the physical limitations of printers and scanners/cameras.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for decoding a two-dimensional color barcode in an image, the barcode having a known layout comprising a plurality of data cells forming a two-dimensional array and a plurality of reference cells having known colors, each data cell and border reference cell having one of a plurality of primary colors, the decoding method including: (a) calculating reference color intensity values for each primary color by averaging color intensity values of pixels in at least some of the reference cells of the primary color; (b) using color values of at least some of the reference cells, calculating a color conversion matrix which converts each input color vector formed by color intensity values of a reference cell to a probability vector formed by probability values of the reference cell being each of the primary colors, the probability values being 1 for the primary color of the reference cell and 0 for other primary colors; (c) for each pixel of the barcode in the image, applying the color conversion matrix to color intensity values of the pixel to calculate pixel-color probabilities with respect to the plurality of primary colors, each representing a probability of the pixel being the corresponding primary color; (d) determining a color of each data cell using the pixel-color probabilities and the color intensity values of at least some of the pixels of the image and the reference color intensity values for each of the primary colors; and (f) converting the colors of the data cells to digital data.

The method may further include, before step (d), using at least some of the reference cells, calculating a channel offset for each of the primary colors, the channel offset being an average positional shift between designed positions and actual positions of reference cells of the primary color, wherein in step (d), the determination further uses the channel offset for each of the primary colors.

In the above method, step (d) may include, for each data cell: (d1) calculating a plurality of predicted cell positions corresponding to the plurality of primary colors, each predicted cell position being calculated by adding the channel offset for the corresponding primary color to a designed position of the data cell; (d2) calculating a plurality of cell-color probabilities with respect to the plurality of primary colors, each representing a probability of the data cell being the corresponding primary color, each being calculated by averaging the pixel-color probabilities with respect to the corresponding primary color over pixels located in a cell-sized area at the predicted cell position for the corresponding primary color; (d3) if a probability difference between a highest value and a second highest value of the plurality of cell-color probabilities is greater than a threshold, then determining the primary color having the highest cell-color probability value to be the color of the data cell; and (d4) if the probability difference is not greater than the threshold, then for each primary color, calculating corresponding observed cell color intensity values by averaging pixel color intensity values over pixels located in a cell-sized area at the predicted cell position for the corresponding primary color, calculating a color difference value between the observed cell color intensity values and the corresponding reference color intensity values for that primary color, and determining the primary color having the smallest color difference value to be the color of the data cell.

The primary colors may be cyan (C), magenta (M), white (W) and black (K), or cyan (C), magenta (M), yellow (Y) and black (K). The color intensity values may be red (R), green (G) and blue (B) values.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

An aspect of the present invention is the layout design of a 2D color barcode which will be printed on media or shown on a screen of a mobile device. Another aspect of the present invention is a 2D color barcode decoding method. The design of the 2D color barcode contains features that facilitate the processing and decoding of the barcode.

Figure 1:
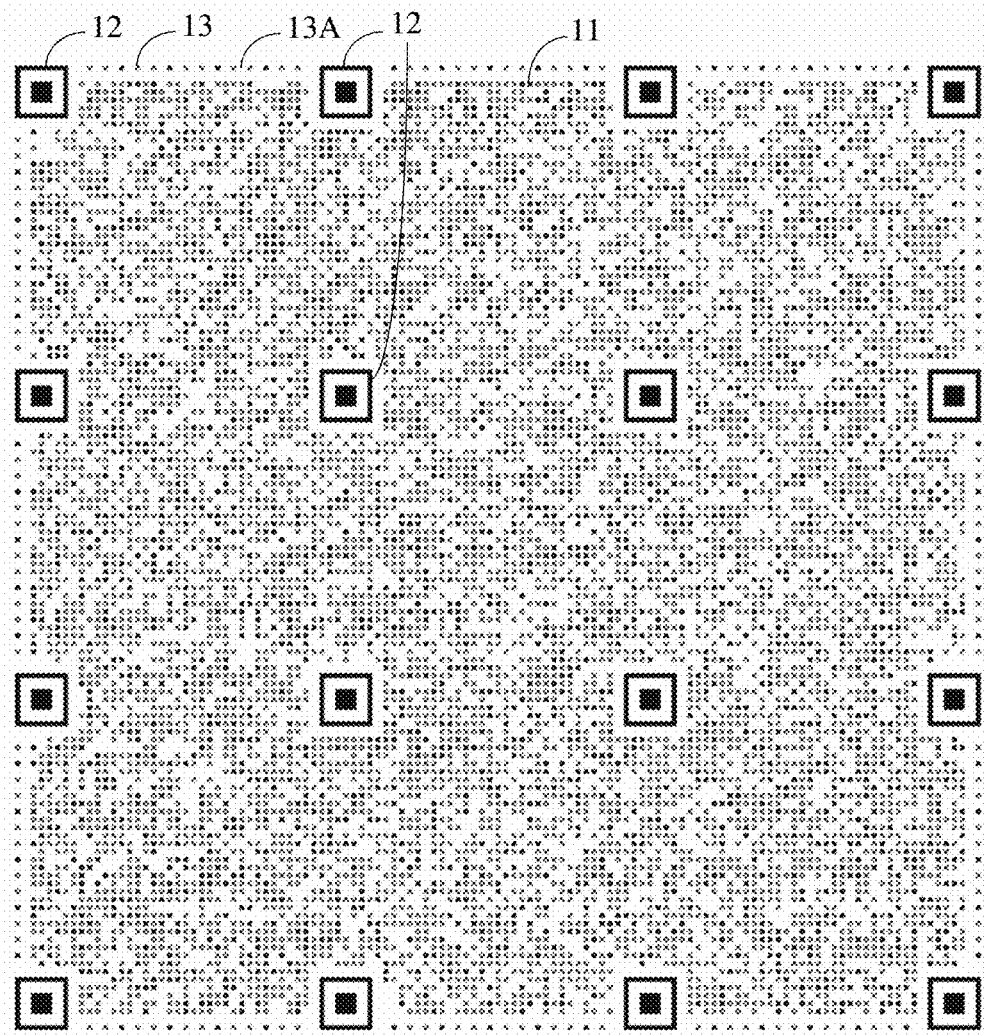
FIG. 1 illustrates a color barcode layout according to an embodiment of the present invention.

FIG. 1 depicts the layout of an exemplary color barcode according to an embodiment of the present invention. The color barcode includes a plurality of data cells 11 forming a two-dimensional array, each cell having one of a plurality of colors. In a preferred embodiment, the plurality of colors are cyan (C), magenta (M), white (W) (i.e., unprinted), and black (K), and each cell can represent 2 bits of information. CMYK are the primary colors used in typical printers, and each of them is printed by one colored ink or toner and referred to as a color channel. In the color barcode layout of FIG. 1, the primary color yellow (Y) is replaced with white (W), i.e., unprinted cells. In this case, the colors CMWK are referred to as the primary colors and color channels. Therefore, each cell in the barcode is printed with one ink or unprinted, and the color of each cell will be uniform. Each cell has a defined size, and cells are separated by defined distances. Preferably the cells are square shaped, form columns and rows that are aligned in the vertical and horizontal directions on a grid, and the row distance and column distance are equal. In one particular embodiment, the cell size is 3×3 pixels and the distance (the width of the white space) between cells is 2 pixels in both horizontal and vertical directions. In this example, the grid is a square grid. Alternatively, the grid may be a rectangular grid.

The barcode has a plurality of locators 12 located at the four corners of the barcode, along the borders of the barcode, as well as in the interior of the barcode. In the illustrated example, sixteen locators 12 are provided, forming a 4×4 array; four locators are located at the corners, eight are located along the borders, and four are located in the interior of the barcode. As will be seen later, the locators 12 can provide position reference within the whole barcode to aid image processing and decoding. The locators are preferably black and substantially larger than the data cells, which make them relatively easy to identify in the image. In the illustrate embodiment, each locator is formed by a solid black square surrounded by a white space and then a black border; the square is 13×13 pixels (i.e. as wide as three columns and three rows of data cells), the white space is 7 pixels wide (i.e. equivalent to the white space created when a column or row of data cells are removed in the data cell area), and the black border is 3 pixels wide (i.e. the same width as the data cells). Thus, each collator 12 is 33×33 pixels in size and occupies the space equivalent to 7×7 data cells in the data cell array.

The barcode also has a plurality of border reference cells 13 located along the four borders of the barcode between the locators. The border reference cells 13 include cyan, magenta and black reference cells that are arranged in a predefined color sequence, e.g. a repeating sequence of C, M, K in the illustrated example. In other words, the color of each border reference cell is known. The reference cells can provide channel offset (global and local) information and color information that is useful in the decoding process. In one embodiment, the border reference cells 13 have the same size as the data cells 11, so that the color densities of these reference cells are similar to those of the data cells.

The border reference cells 13 are separated from each other, from the locators 12 and from the data cells 11 by larger distances than the cell separation in the inside data cell array in order to avoid the potential overlap of reference cells. In the illustrated example, the distance (the white space) between two adjacent reference cells, and between reference cells and adjacent data cells, is 7 pixels (i.e. equivalent to the white space created when a column or row of data cells are removed in the data cell area). The locator 12 and the adjacent reference cells 13 are separated by this distance or a larger distance.

An asymmetry may be designed into the barcode so that one of the four locators in the corners can be distinguished from the others, which is useful in the decoding process. This may be achieved in any suitable ways. For example, one corner locator may have a different shape than the others. An asymmetry may also be designed into the barcode by using different or asymmetric color sequences of the reference cells along the borders. Other additional features may be designed into the barcode as well, such as verification cells that encode the data length and ECC of the barcode, etc.

In one particular example, the grid for a barcode has 124 columns and 124 rows. Excluding the white spaces, the locators and the reference cells, about 13500 data cells can be used to store information in each barcode. Multiple barcodes can be placed adjacent to each other on the same page with a white space of, for example, 20 pixels between them. For a print resolution of 600 dpi, a barcode will take about 1.05×1.05 square inches of space. Thus, up to 7×10 bar codes may be placed on a letter sized page.

In the illustrated embodiment, sixteen locators are located in the corners, along the borders and inside the barcode. In other barcode designs, different numbers and distributions of locators may be used, depending on the size of the barcode. In some examples, four locators located at the corners of the barcode may be sufficient.

A barcode image processing method for processing a barcode having the above design is described below with reference to FIGS. 2 and 2A. First, a color barcode image is captured (step S11). The barcode is printed on paper or displayed on a display screen such as the screen of a mobile device. The barcode image may be captured using a camera, a camera-based barcode reader, a scanner, etc.

Next, the locators 12 in the barcode image are identified (step S12). Any suitable techniques may be used to identify the locators. In one example, the color barcode image is converted to a grayscale image and then binarized, and the locators are identified from the binary image.

Corrections for perspective distortion and non-uniform pixel intensity are optionally performed for the original color barcode image (step S13). Corrections for perspective distortion is desired because the shape barcode in the image can be different the original shape (e.g. square) due to perspective distortion, especially when the barcode image is captured using a camera or camera-based barcode reader and when the printed sheet or mobile screen containing the barcode is held at an angle with respect to the camera or barcode reader. Any suitable algorithm may be used to perform the perspective correction. In one implementation, this process is performed using the locators identified in step S12, by dividing the barcode image into a number of smaller regions each containing four locations. Perspective correction is applies to each smaller region to transform them to the undistorted shape (e.g. square), and then the smaller regions are combed again into the barcode. This corrected barcode image will have a shape close to the original barcode layout.

Correction for non-uniform pixel intensity may be important for a barcode image captured with a camera or camera-based barcode reader (as opposed to a scanner), because the pixel intensities of the barcode image can often be affected by lighting conditions which may cause the pixel intensities to be non-uniform across the barcode. Any suitable algorithm may be used to perform the illumination correction. In one implementation, this process is performed using the locators identified in step S12, by first estimating the average observed pixel intensities of the locators 12, then using them to calculate a 2-dimensional illumination correction map. The correction functions at the positions of the locators 12 are such that the measured intensities of the locators are mapped to the pixel value of ideal black; the correction functions at positions other than the locators are then calculated by 2-dimensional interpolation.

After these corrections, a decoding process is applied to the corrected color barcode image to extract the color data of the data cells (steps S14-S20).

First, the grid point positions of the barcode are calculated using the locators (step S14). As mentioned earlier, the designed positions of all reference cells and data cells are located on the grid (e.g., the center pixel of the cells are on the grid points).

The reference cells 13 are used to calculate the channel offset for each primary color channel (e.g. C, M, W, K) (step S15). As discussed earlier, channel offset is a positional shift of pixels printed with different primary colors caused by printer hardware factors; channel offset can result in the actual printed positions of the barcode cells to be shifted form their designed positions (on the grid points) by different amounts depending on their colors. Cells of the same color tend to be shifted by approximately the same amount. Such offset is typically small compared to the size of the barcode cells. Since the reference cells 13 have known colors, their actual printed positions can be measured and compared to their designed positions to estimate the offset for each color channel. In a preferred embodiment, the positional shift of all reference cells of the same color are averaged to calculate the channel offset for that color channel. Such channel offsets are global values for the entire barcode. The channel offset for the cyan and magenta colors are calculated this way. Note that because black locator cells 12 are used as positional reference to calculate the designed positions of the cells, the black channel has zero offset by definition.

When calculating channel offset in step S15, the actual positions of the reference cells 13 may be obtained using any suitable methods. For example, one way is to project each column and row of reference cells to the axis parallel to that border, and identify the peaks and valleys in the projection profile. The projected horizontal borders will give the horizontal shifts of the reference cells and the projected vertical borders will give the vertical shifts of the reference cells.

The color intensity (the RGB values) of each reference cell 13 is calculated (step S16). For each reference cell, the average R, G, and B values of the pixels in a cell-sized area (e.g. 3×3 pixel in size) located at the shifted positions for that color channel are calculated as the R, B, and B values of that reference cell. Note here that while the primary colors used by the printer to print the image are CMYK, the primary colors used by the scanner/camera to scan the image are RGB.

In step S16, the cell-sized white spaces between neighboring C, M or K reference cells, as indicated by reference symbol 13A in FIG. 1, are considered white reference cells and their color intensities (RGB values) are calculated as well.

The reference color for each of the color channels C, M, W and K is calculated, by averaging the color intensity (RGB) values of all reference cells of the respective color channel (step S17).

Using the color intensities of the individual reference cells, a 4×4 color conversion matrix is calculated (step S18). More specifically, the color conversion matrix is calculated from the following equation:

$$\begin{bmatrix} R_{C1} & G_{C1} & B_{C1} & 1 \\ R_{C2} & G_{C2} & B_{C2} & 1 \\ & \cdots & & \\ R_{M1} & G_{M1} & B_{M1} & 1 \\ & \cdots & & \\ R_{W1} & G_{W1} & B_{W1} & 1 \\ & \cdots & & \\ R_{K1} & G_{K1} & B_{K1} & 1 \\ & \cdots & & \end{bmatrix} [4X4] = \begin{bmatrix} 1 & 0 & 0 & 0 \\ 1 & 0 & 0 & 0 \\ & \cdots & & \\ 0 & 1 & 0 & 0 \\ & \cdots & & \\ 0 & 0 & 1 & 0 \\ & \cdots & & \\ 0 & 0 & 0 & 1 \\ & \cdots & & \end{bmatrix}$$

where the first matrix on the left is an input matrix, the second matrix on the left denoted "[4×4]" is the color conversion matrix, and the matrix on the right is an output matrix.

The input matrix is an N×4 matrix constructed from the color intensities of individual reference cells as follows, where N is the total number of reference cells used in this calculation. Each row of the input matrix is a vector formed by the R, G, B (color intensity) values of a reference cell and a value 1 in the last column. In the above equation, "C1," "C2," . . . denote the first, second, . . . cyan reference cells; "M1," "M2," . . . denote the first, second, . . . magenta reference cells; "W1," "W2," . . . denote the first, second, . . . white reference cells; and "K1," "K2," . . . denote the first, second, . . . black reference cells.

The output matrix has the same size as the input matrix, i.e. N×4, and each row corresponds to the same reference cell as the corresponding row of the input matrix. Each row of the output matrix is a label vector (also referred to as a probability vector) of the color of the corresponding reference cell, for example, [1, 0, 0, 0] for cyan, [0, 1, 0, 0] for magenta, [0, 0, 1, 0] for white, and [0, 0, 0, 1] for black.

A pseudo inverse method is applied to the above equation to compute the color conversion matrix between the input matrix and the output matrix.

From the above equation, it can be seen that the color conversion matrix is a matrix that converts each input color vector formed by color values of a reference cell to a probability vector formed by probability values of the reference cell being each of the primary colors, the probability values being 1 for the primary color of the reference cell and 0 for other primary colors.

Then, the color conversion matrix is applied to the RGB values of each pixel of the barcode image to compute the probabilities of that pixel being cyan, magenta, white and black (step S19). More specifically, a vector [R, G, B, 1], formed by the R, G, B values of the pixel and the value 1, is multiplied by the 4×4 conversion matrix to computer a probability vector $[P_C, P_M, P_W, P_K]$, which represents the four probabilities of that pixel being the C, M, W and K colors, respectively. These probabilities are referred to as pixel-color probabilities.

Using these pixel-color probabilities, the color of each data cell is determined (step S20). This determination step, which is applied to each data cell, is described in detail with reference to FIG. 2A.

The possible predicted positions of the data cell for each color channel are first calculated (step S31). Due to channel offset discussed earlier, the data cell may be actually located at three possible predicted positions depending on the color of the cell: a first shifted position if the color is cyan, a second shifted position if the color is magenta, and an un-shifted position (e.g. the grid point position) if the color is white or black. The first and second shifted positions are calculated from the channel offset obtained in step S15. In other words, if the cell is of a particular color, then it should be located at the corresponding predicted position for that color channel.

Two criteria are used in the cell color determination. The first criterion involves the probability that a cell of a particular color (C, M, W or K) is present at the predicted actual position (shifted or un-shifted) for that color channel. Thus, four probabilities (referred to as the cell-color probabilities) are computed for the four color channels (C, M, W and K), i.e.: the probability of a cell at the first shifted position being cyan, the probability of a cell at the second shifted position being magenta, the probability of a cell at the un-shifted position being white, and the probability of a cell at the un-shifted position being black (step S32). Each cell-color probability is the average of the pixel-color probabilities for the particular color (i.e., $P_C, P_M, P_W$, or $P_K$) of the multiple pixels in the cell-sized area (e.g. 3×3 pixels) located at the corresponding predicted position for that color channel. For example, at the first shifted position (for cyan), the pixel-color probabilities for cyan $P_C$ for pixels in the cell-sized area at that position are averaged to calculate the cell-color probability for cyan—i.e. the probability that a cyan data cell is actually located at that shifted position. The M, W and K cell color-probabilities are similarly calculated.

Then, among the four cell-color probabilities for C, M, W and K, if the difference between the highest probability and the second highest probability is greater than a threshold (for example, greater than ("yes" in step S33), then the color with the highest cell-color probability is determined to be the color of that data cell (step S34).

If, on the other hand, the difference between the highest and the second highest cell-color probabilities is not sufficiently large ("no" in step S33), then a second criterion based on color differences between observed cell color and reference color for the four color channels is used to determine the color of the data cell (steps S35-S37). Specifically, at the predicted position corresponding to each color channel, an observed cell color is calculated by averaging R, G, B (color intensity) values of pixels in the cell-sized area at that location (step S35). For each color channel, a color difference between the observed cell color at the predicted position of that channel and the reference color for that color channel is calculated (step S36). The reference color for each color channel is the value calculated in step S17, i.e. the average R, G, B (color intensity) values of all reference cells of that color channel. Thus, four color differences for the C, M, W and K color channels are computed in step S36. The four color differences K are compared to each other, and the color channel that has the smallest color difference is determined to be the color of the data cell (step S37).

In step S36, the color difference between these two colors is a scalar value calculated from the two sets of RGB values. Any suitable definitions of a color difference may be used. For example, the RGB values may be first converted to another color space, such as CIE L*a*b* or CIE L*u*v*, and the color difference may be calculated using known equations such as CIEDE94 (2:1:1).

In the method described above, white (unprinted) is used in place of yellow as one of the primary colors. The method is also applicable when yellow is used as the primary color.

Figure 2:
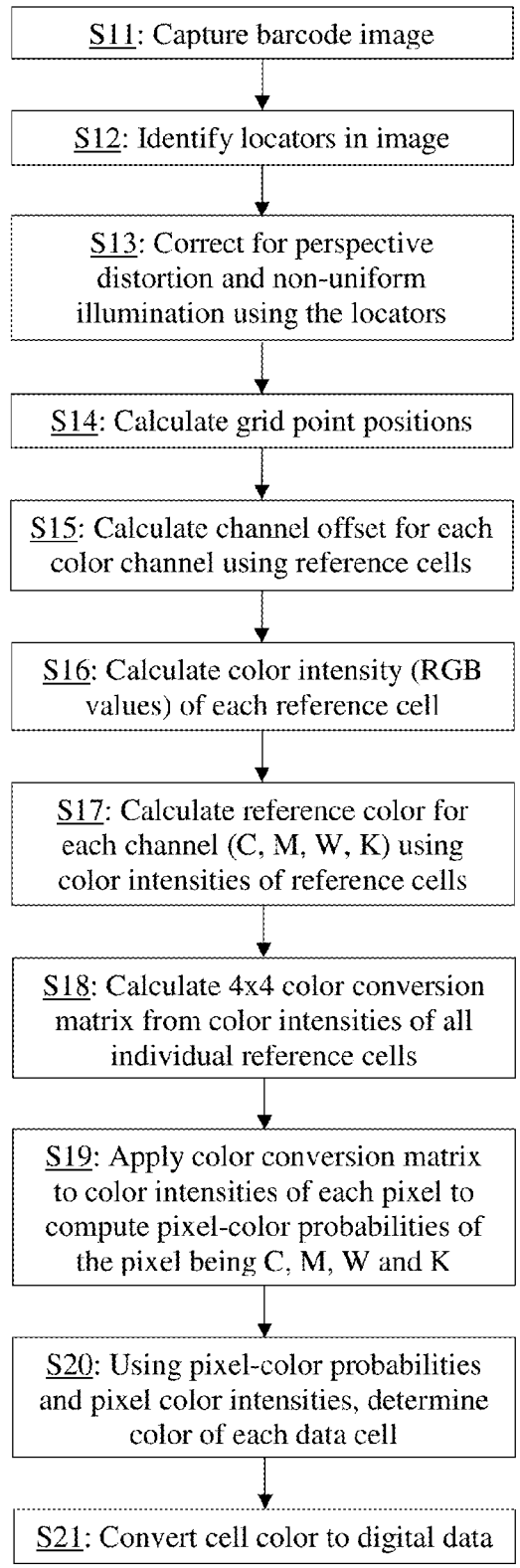
FIGS. 2 and 2A schematically illustrate a method for decoding a 2D color barcode according to an embodiment of the present invention.
Figure 2A:
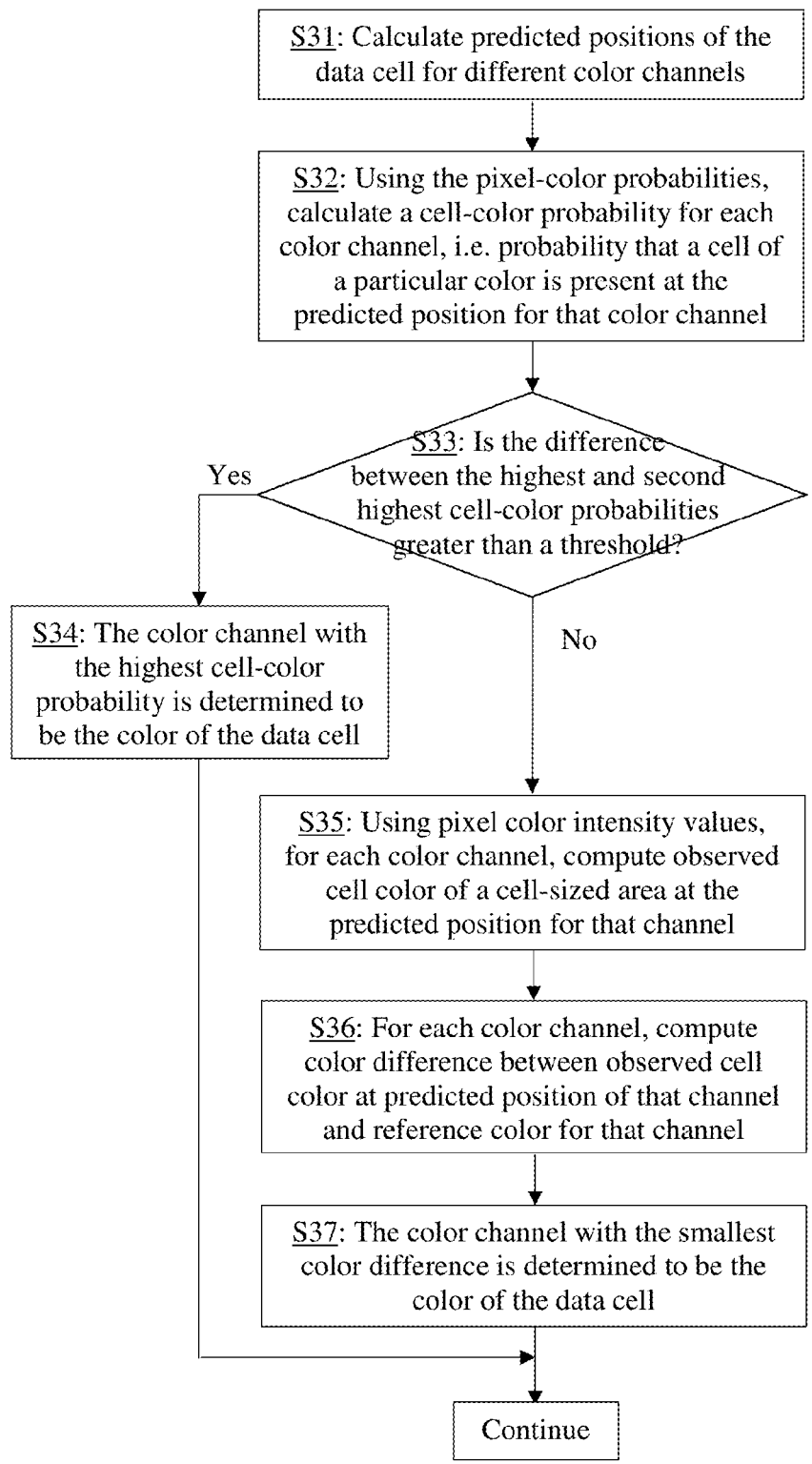

Once the cell color is determined from step S34 or S36, the cell color is converted to digital data (step S21, FIG. 2). The barcode is decoded by extracting the digital data stored in all of the data cells.

Figure 3:
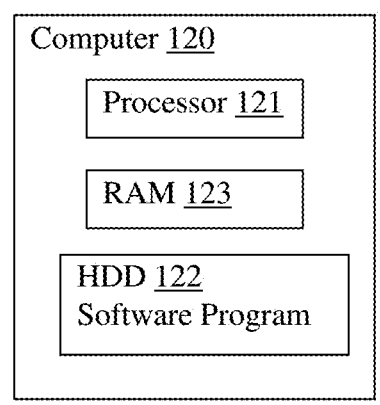
FIG. 3 schematically illustrates a data processing apparatus in which embodiments of the present invention may be implemented.

The color barcode image processing methods described here can be implemented in a data processing system such as a computer 120 as shown in FIG. 3. The computer 120 comprises a processor 121, a storage device (e.g. hard disk drive) 122, and an internal memory (e.g. a RAM) 123. The storage device 122 stores software programs, which are read out to the RAM 123 and executed by the processor 121 to carry out the methods. In one aspect, the invention is a method carried out by a data processing system. In another aspect, the invention is computer program product embodied in computer usable non-transitory medium having a computer readable program code embedded therein for controlling a data processing apparatus to carry out the method. In another aspect, the invention is embodied in a data processing system.

It will be apparent to those skilled in the art that various modification and variations can be made in the color barcode image processing method and related apparatus of the present invention without departing from the spirit or scope of the invention. Thus, it is intended that the present invention cover modifications and variations that come within the scope of the appended claims and their equivalents.

What is claimed is:

1. A method for decoding a two-dimensional color barcode in an image, the barcode having a known layout comprising a plurality of data cells forming a two-dimensional array and a plurality of reference cells having known colors, each data cell and border reference cell having one of a plurality of primary colors, the decoding method comprising:

(a) calculating reference color intensity values for each primary color by averaging color intensity values of pixels in at least some of the reference cells of the primary color;

(b) using color values of at least some of the reference cells, calculating a color conversion matrix which converts each input color vector formed by color intensity values of a reference cell to a probability vector formed by probability values of the reference cell being each of the primary colors, the probability values being 1 for the primary color of the reference cell and 0 for other primary colors;

(c) for each pixel of the barcode in the image, applying the color conversion matrix to color intensity values of the pixel to calculate pixel-color probabilities with respect to the plurality of primary colors, each representing a probability of the pixel being the corresponding primary color;

(d) determining a color of each data cell using the pixel-color probabilities and the color intensity values of at least some of the pixels of the image and the reference color intensity value for each of the primary colors; and (e) converting the colors of the data cells to digital data.

2. The method of claim 1, further comprising, before step (d), using at least some of the reference cells, calculating a channel offset for each of the primary colors, the channel offset being an average positional shift between designed positions and actual positions of reference cells of the primary color, wherein in step (d), the determination further uses the channel offset for each of the primary colors.

3. The method of claim 2, wherein step (d) includes, for each data cell:

(d1) calculating a plurality of predicted cell positions corresponding to the plurality of primary colors, each predicted cell position being calculated by adding the channel offset for the corresponding primary color to a designed position of the data cell;

(d2) calculating a plurality of cell-color probabilities with respect to the plurality of primary colors, each representing a probability of the data cell being the corresponding primary color, each being calculated by averaging the pixel-color probabilities with respect to the corresponding primary color over pixels located in a cell-sized area at the predicted cell position for the corresponding primary color;

(d3) if a probability difference between a highest value and a second highest value of the plurality of cell-color probabilities is greater than a threshold, then determining the primary color having the highest cell-color probability value to be the color of the data cell; and (d4) if the probability difference is not greater than the threshold, then for each primary color, calculating corresponding observed cell color intensity values by averaging pixel color intensity values over pixels located in a cell-sized area at the predicted cell position for the corresponding primary color, calculating a color difference value between the observed cell color intensity values and the corresponding reference color intensity values for that primary color, and determining the primary color having the smallest color difference value to be the color of the data cell.

4. The method of claim 3, wherein in step (d4), the color difference value is calculated by converting the observed cell color intensity values and the corresponding reference color intensity values into a standard color space and then calculating a color difference value in the standard color space.

5. The method of claim 1, wherein step (b) includes:

constructing an N×4 input matrix, N being a number of reference cells used in the calculation, wherein each row of the input matrix corresponds to a reference cell and is a vector formed by the color intensity values of the reference cell and a value 1;

constructing an N×4 output matrix, wherein each row of the output matrix corresponds to the same reference cell of the corresponding row of the input matrix and is the probability vector for that reference cell; and computing the conversion matrix such that the output matrix is the product of the input matrix and the conversion matrix.

6. The method of claim 1, wherein the primary colors are cyan (C), magenta (M), white (W) and black (K).

7. The method of claim 1, wherein the primary colors are cyan (C), magenta (M), yellow (Y) and black (K).

8. The method of claim 1, wherein the color intensity values are red (R), green (G) and blue (B) values.

9. A computer program product comprising a computer usable non-transitory medium having a computer readable program code embedded therein for controlling a data processing apparatus, the computer readable program code configured to cause the data processing apparatus to execute a process for decoding a two-dimensional color barcode in an image, the barcode having a known layout comprising a plurality of data cells forming a two-dimensional array and a plurality of reference cells having known colors, each data cell and border reference cell having one of a plurality of primary colors, the decoding process comprising:

(a) calculating reference color intensity values for each primary color by averaging color intensity values of pixels in at least some of the reference cells of the primary color;

(b) using color values of at least some of the reference cells, calculating a color conversion matrix which converts each input color vector formed by color intensity values of a reference cell to a probability vector formed by probability values of the reference cell being each of the primary colors, the probability values being 1 for the primary color of the reference cell and 0 for other primary colors;

(c) for each pixel of the barcode in the image, applying the color conversion matrix to color intensity values of the pixel to calculate pixel-color probabilities with respect to the plurality of primary colors, each representing a probability of the pixel being the corresponding primary color;

(d) determining a color of each data cell using the pixel-color probabilities and the color intensity values of at least some of the pixels of the image and the reference color intensity values for each of the primary colors; and (f) converting the colors of the data cells to digital data.

10. The computer program product of claim 9, wherein the process further comprises, before step (d), using at least some of the reference cells, calculating a channel offset for each of the primary colors, the channel offset being an average positional shift between designed positions and actual positions of reference cells of the primary color, wherein in step (d), the determination further uses the channel offset for each of the primary colors.

11. The computer program product of claim 10, wherein step (d) includes, for each data cell:
(d1) calculating a plurality of predicted cell positions corresponding to the plurality of primary colors, each predicted cell position being calculated by adding the channel offset for the corresponding primary color to a designed position of the data cell;
(d2) calculating a plurality of cell-color probabilities with respect to the plurality of primary colors, each representing a probability of the data cell being the corresponding primary color, each being calculated by averaging the pixel-color probabilities with respect to the corresponding primary color over pixels located in a cell-sized area at the predicted cell position for the corresponding primary color;
(d3) if a probability difference between a highest value and a second highest value of the plurality of cell-color probabilities is greater than a threshold, then determining the primary color having the highest cell-color probability value to be the color of the data cell; and
(d4) if the probability difference is not greater than the threshold, then for each primary color, calculating corresponding observed cell color intensity values by averaging pixel color intensity values over pixels located in a cell-sized area at the predicted cell position for the corresponding primary color, calculating a color difference value between the observed cell color intensity values and the corresponding reference color intensity values for that primary color, and determining the primary color having the smallest color difference value to be the color of the data cell.

12. The computer program product of claim 11, wherein in step (d4), the color difference value is calculated by converting the observed cell color intensity values and the corresponding reference color intensity values into a standard color space and then calculating a color difference value in the standard color space.

13. The computer program product of claim 9, wherein step (b) includes:
constructing an N×4 input matrix, N being a number of reference cells used in the calculation, wherein each row of the input matrix corresponds to a reference cell and is a vector formed by the color intensity values of the reference cell and a value 1;
constructing an N×4 output matrix, wherein each row of the output matrix corresponds to the same reference cell of the corresponding row of the input matrix and is the probability vector for that reference cell; and
computing the conversion matrix such that the output matrix is the product of the input matrix and the conversion matrix.

14. The computer program product of claim 9, wherein the primary colors are cyan (C), magenta (M), white (W) and black (K).

15. The computer program product of claim 9, wherein the primary colors are cyan (C), magenta (M), yellow (Y) and black (K).

16. The computer program product of claim 9, wherein the color intensity values are red (R), green (G) and blue (B) values.

* * * * *